Figure 1:
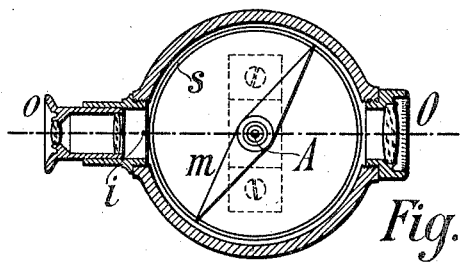
Figure 1A:
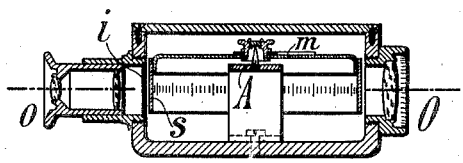

No. 811,777. PATENTED FEB. 6, 1906.
A. KÖNIG.
ANGLE MEASURING INSTRUMENT.
APPLICATION FILED DEC. 22, 1904.

2 SHEETS—SHEET 1.

Witnesses
Paul Krüger
Fritz Sander

Inventor
Albert König

No. 811,777. PATENTED FEB. 6, 1906.
A. KÖNIG.
ANGLE MEASURING INSTRUMENT.
APPLICATION FILED DEC. 22, 1904.
2 SHEETS—SHEET 2.
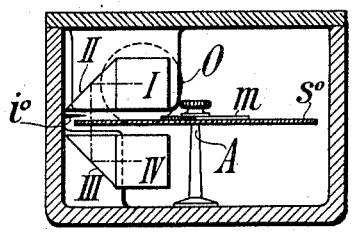
Fig.5
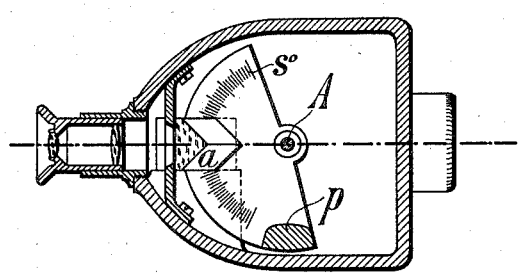
Fig.4ª
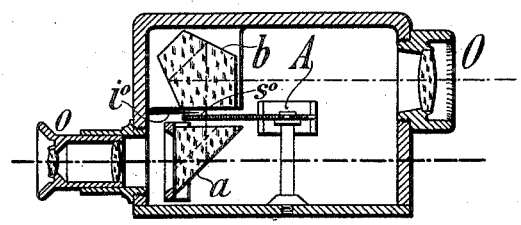
Fig.4
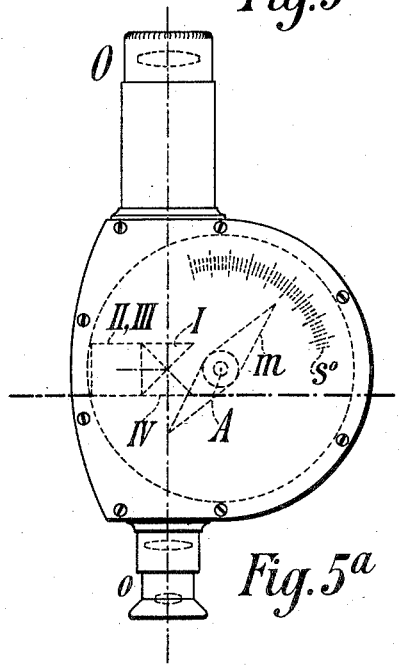
Fig.5ª
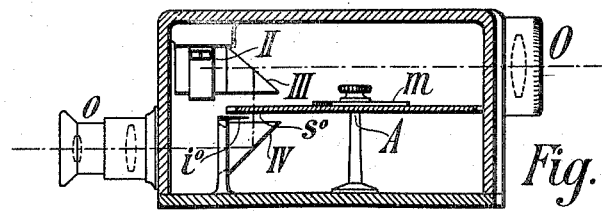
Fig.6
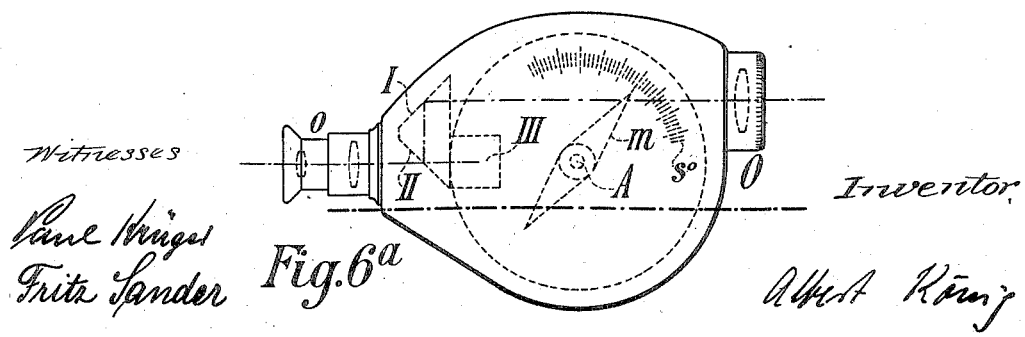
Fig.6ª
Witnesses
Paul Krügel
Fritz Sander
Inventor
Albert König

UNITED STATES PATENT OFFICE.

ALBERT KÖNIG, OF JENA, GERMANY, ASSIGNOR TO THE FIRM OF CARL ZEISS, OF JENA, GERMANY

ANGLE-MEASURING INSTRUMENT.

No. 811,777.     Specification of Letters Patent.     Patented Feb. 6, 1906.

Application filed December 22, 1904. Serial No. 238,006.

*To all whom it may concern:*

Be it known that I, ALBERT KÖNIG, doctor of philosophy, a citizen of the German Empire, residing at Carl-Zeiss-Strasse, Jena, in the Grand Duchy of Saxe Weimar, German Empire, have invented a new and useful Angle-Measuring Instrument, of which the following is a specification.

The invention relates to free-hand instruments in which with a telescope a device is combined for measuring the angular distance of the point observed through the telescope in relation to the invariable direction of a terrestrial force either gravity or the horizontal component of terrestrial magnetism. Instruments of this kind are provided with a body hereinafter called a "director," which is rotatable on an axis fixed to the telescope and stands under the influence of the terrestrial force, so that the telescope may be rotated in a plane perpendicular to the axis of the director without a change in the position of the director relatively to the direction of the terrestrial force. For determining the angular position of the telescope relatively to the direction of the terrestrial force a circular scale is fixed to the director concentrically to the axis of rotation, the index being rigidly connected with the telescope. This class of instruments embraces such telescopic instruments for measuring angular altitudes and other vertical angles in which a pendulum serves as the director and such telescopic bearing-compasses and other instruments for measuring horizontal angles in which a magnetic needle is the director.

The free-hand instruments of this description are modified according to the invention in such a way that the observer is enabled to read off the angular distance in the telescope itself. In order to attain this object, the cylindrical scale connected with the director is made to pass through the field of view of the telescope, preferably touching the focal plane of it in a straight line passing through the focal point.

In order to render the division of the scale sharply visible even toward the margin of the field, the radius of curvature of the scale may be enlarged by deviating from the cylindrical form. For instance, the simplest form, the plane one, may be adopted for the scale, which is then entirely transferred into the focal plane; but in these cases the telescope must be a broken one in the particular case of the plane scale a right-angled or a parallel-vision telescope. In all cases of broken telescopes the deflecting-prisms may be so arranged that they act in addition to breaking the optical axis as a means for reërecting the image. Examples of such arrangement are the prism systems of the prismatic field-glasses.

A further advantage in the free-hand use of these instruments improved as described is obtained by such a relation between the focal length of the objective and the diameter of the scale that the angular values of the image produced in the focal plane are equal to those of the scale. This is the case whenever the focal length of the objective is equal to the radius of the scale. If in that event the direction of the telescope in the plane of rotation of the scale be altered, the scale and the telescopic image will pass over the field of view without any appreciable change in their relative position. With instruments of this construction an index-wire in the image-field of the telescope can be dispensed with, as no longer is only one line of sight available, but accurate readings are possible in any position within the field of the image-point under observation.

Figure 2:
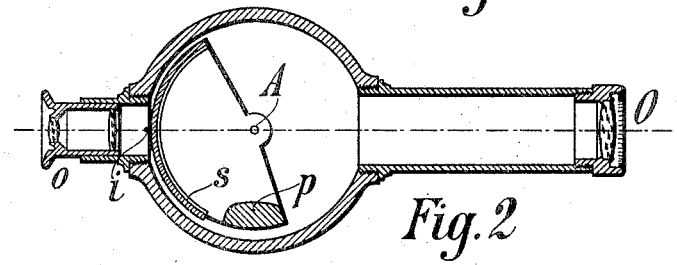
Figure 2A:
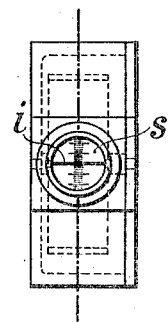
Figure 3:
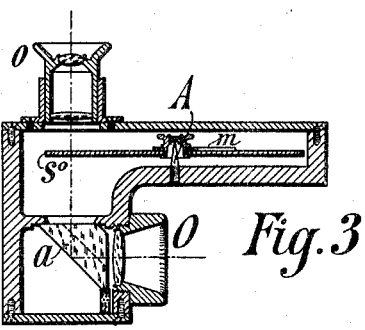
Figure 3A:
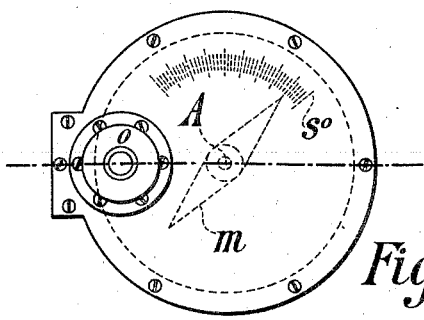

In the accompanying drawings, Figure 1 is a horizontal section through a bearing-compass. Fig. 1ª is a longitudinal vertical section through the same compass. Fig. 2 is a longitudinal vertical section through an instrument for measuring angular altitudes, positive as well as negative. Fig. 2ª is a front view of the same instrument, the occular being removed. Fig. 3 is a longitudinal vertical section through another bearing-compass. Fig. 3ª is a plan view of the same compass. Fig. 4 is a horizontal section through another altitude instrument. Fig. 4ª is a longitudinal vertical section through the same instrument. Fig. 5 is a transverse vertical section through a third bearing-compass. Fig. 5ª is a plan view of the same compass. Fig. 6 is a longitudinal vertical section through a fourth bearing-compass. Fig. 6ª is a plan view of the same compass.

The bearing-compass shown in Figs. 1 and 1ª comprises an astronomical telescope composed of the objective O and the eyepiece o and the compass-needle m, (the director,) rotatable on the fixed axle A and carrying the cylindrical scale s coaxially. This scale is made of glass or some other transparent material and its axis being the axis of rotation of the needle intersects the optical axis of the telescope at right angles. The scale touches the focal plane of the telescope in proximity to the index-wire i and repasses, with its opposite point, the field so closely to the objective O that this second passage is not perceived by the observer. The operation is as follows: The compass is taken in the free hand and directed toward the object until the telescopic image of the latter is seen to be covered by the index i. Then that point of the slightly oscillating scale is read off, the amplitudes of which right and left of the wire are equal. The scale is adjusted to the compass-needle in such a way that the angle read off is that between the direction to the object and the magnetic meridian.

In the angular altitude instrument represented in Figs. 2 and 2ª the pendulum p (the director) carries the cylindrical scale s, which differs from that in Figs. 1 and 1ª in so far as it extends merely through a quadrant. The operation is essentially the same as with the instrument shown in Figs. 1 and 1ª.

In Figs. 3 and 3ª a bearing-compass is shown in which the cylindrical scale is replaced by an ordinary (but transparent) plane graduated compass-card s°. The eyepiece o stands vertical, and a reflecting-prism a is situated below the focal plane in which the scale s° rotates. This well-known prism erects the inverted telescopic image not only in respect of top and bottom, but also laterally, owing to the slanting position of its reflecting surfaces which form a ridge. The instrument is thus provided with a right-angled terrestrial telescope. The compass shown in Figs. 3 and 3ª is also an example of the arrangement above dealt with—viz., that the focal length of the objective is equal to the radius of the scale. In consequence thereof the index has been omitted.

The altitude instrument, Figs. 4 and 4ª, is likewise fitted with a plane scale s°, and also with an index i°. The telescope is a parallel vision terrestrial telescope. The first of its prisms, a double-reflecting Prandl prism b, produces no change in the position of the telescopic image, while the prism a, the same as in Figs. 3 and 3ª, erects this image.

The bearing-compass shown in Figs. 5 and 5ª and that shown in Figs. 6 and 6ª are also each provided with a parallel vision terrestrial telescope. In both examples a plane compass-card s°, as in Figs. 3 and 3ª, is employed, but in Figs. 5 and 5ª the direction of the line of sight of the telescope is tangential to the card and in Figs. 6 and 6ª diametrical, while owing to the different arrangement of the prisms the observer will see the division of the scale upright in both cases. The prism system in Figs. 5 and 5ª, consisting of four totally-reflecting prisms I, II, III, and IV, is the less usual of the two Porro reversing systems. In Figs. 6 and 6ª the same four prisms are arranged in the order of the other Porro system well known from the prism field-glasses.

What I claim as my invention, and desire to secure by Letters Patent, is—

1. A telescopic angle-measuring free-hand instrument consisting of a telescope, a circular scale rotatable about an axis—which is central to it and fixed relatively to the telescope—and passing through the focus of the telescope transversely to the optical axis, and a director rigidly connected to the scale and subject to an invariable terrestrial force.

2. A telescopic angle-measuring free-hand instrument consisting of a telescope, a transparent circular scale rotatable about an axis—which is central to it and fixed relatively to the telescope—and passing through the focus of the telescope transversely to the optical axis, and a director rigidly connected to the scale and subject to an invariable terrestrial force.

3. A telescopic angle-measuring free-hand instrument consisting of a telescope, a transparent circular scale rotatable about an axis—which is central to it and fixed relatively to the telescope—and passing through the focus of the telescope transversely to the optical axis, and a director rigidly connected to the scale and subject to an invariable terrestrial force, the focal length of the telescopic objective being equal to the radius of the scale.

In testimony whereof I have signed my name to this specification in the presence of two subscribing witnesses.

ALBERT KÖNIG.

Witnesses:
PAUL KRÜGER,
FRITZ SANDER.